(12) United States Patent
Banzet et al.

(10) Patent No.: US 12,544,064 B2
(45) Date of Patent: Feb. 10, 2026

(54) SURGICAL DEVICE, DEVICE FOR PRE-BENDING A BUCKLING WIRE, METHOD FOR FELTING AN IMPLANT TO SOFT TISSUE, AND METHOD FOR PRE-BENDING A BUCKLING WIRE

(71) Applicant: ZURIMED TECHNOLOGIES AG, Zürich (CH)

(72) Inventors: Pol Banzet, Zürich (CH); Reto Graf, Zürich (CH); Elias Bachmann, Zürich (CH); Xiang Li, Uster (CH)

(73) Assignee: ZURIMED TECHNOLOGIES AG (CH)

(*) Notice: Subject to any disclaimer, the term of this patent is extended or adjusted under 35 U.S.C. 154(b) by 148 days.

(21) Appl. No.: 18/694,519

(22) PCT Filed: Nov. 28, 2022

(86) PCT No.: PCT/EP2022/083491
§ 371 (c)(1),
(2) Date: Mar. 22, 2024

(87) PCT Pub. No.: WO2023/099409
PCT Pub. Date: Jun. 8, 2023

(65) Prior Publication Data
US 2024/0389998 A1    Nov. 28, 2024

(30) Foreign Application Priority Data
Nov. 30, 2021    (EP) ..................................... 21211467

(51) Int. Cl.
*A61B 17/06*    (2006.01)
*A61B 17/00*    (2006.01)

(52) U.S. Cl.
CPC ................... *A61B 17/06066* (2013.01); *A61B 2017/00367* (2013.01); *A61B 2017/00526* (2013.01);
(Continued)

(58) Field of Classification Search
CPC .............. A61B 17/06; A61B 17/06066; A61B 2017/06095
See application file for complete search history.

(56) References Cited

U.S. PATENT DOCUMENTS

| 2005/0101984 A1* | 5/2005 | Chanduszko ...... A61B 17/0057 606/185 |
| 2008/0103527 A1 | 5/2008 | Martin et al. |
| 2019/0365362 A1 | 12/2019 | Ralph |
| 2021/0259799 A1 | 8/2021 | Lessard et al. |

FOREIGN PATENT DOCUMENTS

| EP | 3338683 A1 | 6/2018 |
| EP | 4 243 702 A | 9/2023 |

(Continued)

OTHER PUBLICATIONS

European Office Action for EP Application No. 21211467.2 dated Nov. 3, 2024.
(Continued)

*Primary Examiner* — Tuan V Nguyen
(74) *Attorney, Agent, or Firm* — Foley & Lardner LLP

(57) ABSTRACT

The invention relates to a surgical device for felting an implant to soft tissue of a patient. The device comprises at least one felting needle that is configured to move reciprocally. The device comprises a needle protection mechanism to prevent the at least one felting needle from being damaged due to a contact with rigid structure during the reciprocal motion. The needle protection mechanism comprises a buckling wire that is configured to transfer the reciprocal motion from the actuator to the at least one felting needle.

(Continued)

The buckling wire is configured to buckle if the at least one felting needle contacts the rigid structure such that the buckling wire axially compressed.

17 Claims, 9 Drawing Sheets

(52) U.S. Cl.
CPC ............... *A61B 2017/00836* (2013.01); *A61B 2017/00862* (2013.01); *A61B 2017/00867* (2013.01)

(56) References Cited

FOREIGN PATENT DOCUMENTS

| | | |
|---|---|---|
| JP | 2002014020 A | 1/2002 |
| WO | 2020227838 A1 | 11/2020 |
| WO | 2022100832 A1 | 5/2022 |
| WO | 2022100834 A1 | 5/2022 |
| WO | WO-2022/100833 A1 | 5/2022 |

OTHER PUBLICATIONS

International Search Report and Written Opinion in corresponding International Application No. PCT/EP2022/083491 dated Apr. 14, 2023.
Search Report in corresponding European patent application No. 21211467.2 dated May 27, 2022.

\* cited by examiner

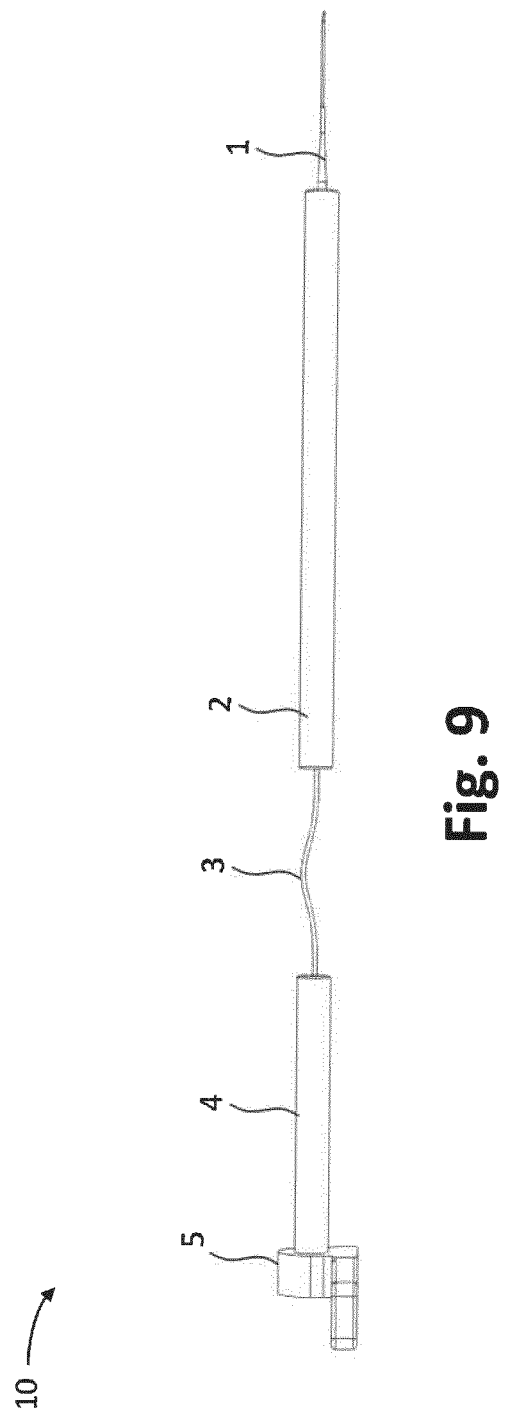

SURGICAL DEVICE, DEVICE FOR PRE-BENDING A BUCKLING WIRE, METHOD FOR FELTING AN IMPLANT TO SOFT TISSUE, AND METHOD FOR PRE-BENDING A BUCKLING WIRE

CROSS-REFERENCE TO RELATED APPLICATION

This application is a Section 371 National Stage Application of International Application No. PCT/EP2022/083491, filed Nov. 28, 2022 and published as WO 2023/099409 A1 on Jun. 8, 2023, in English, and claims priority to European application No. 21211467.2, filed Nov. 30, 2021.

FIELD

The present invention relates to a surgical device, a device for pre-bending a buckling wire, a method for felting an implant to soft tissue, and a method for pre-bending a buckling wire.

BACKGROUND

The present applicant recently developed a surgical felting device allowing a biomechanically advantageous implantation of implants. The developed device allows an improved fixation as compared to conventional suturing techniques. One example of such a surgical felting device is disclosed in PCT/CH2019/000015. The surgical felting device comprises a needle that repeatedly moves through a surgical felt and into tissue. By embedding strands of a felt inside tissue, the needle creates a strong and well distributed mechanical bond between the felt and the tissue. Compared to conventional suturing, this technique is faster and alleviates adverse effects such as "cheesewiring" of suture, where the suture cuts through tissue which can happen through local stress peaks.

However, since the surgical felting device is manually handled and the needle moves at high speeds, there is high risk of needle damage. The damage may result from collisions between the needle and rigid structures such as bones or other surgical tools. Such collisions could lead to a partial destruction of the needle (plastic bending, breaking or splintering) which adversely influences the functionality. Even further, parts of the needle may be lost inside the patient's body, presenting a health risk.

It is desired to overcome the above disadvantages of the prior art. In particular, it is desired to provide a surgical felting device that is safe to use for the operator and the patient.

SUMMARY

One aspect of the invention relates to a surgical device for felting an implant to soft tissue of a patient, in particular a human. Felting as used herein may be understood as an intertwining and/or entangling of tissue fibers and implant fibers. Example felting needles and their properties are described in PCT/CH2019/000015, PCT/EP2020/081887, PCT/EP2020/081891, and PCT/EP2020/081881. The device comprises at least one felting needle that is configured to move reciprocally. A felting needle may be a needle with one or more barbs. The barbs may be configured to push individual fibers of a fibrous implant material inwards when the needle is pushed through the implant and into the soft tissue. The reciprocal motion may be understood as a back-and-forth motion. For example, the needle is moved along a line or rotated around an axis about an angle. The implant may be provided with the surgical device and/or may include a fibrous implant material that is suitable to be felted to soft tissue. Implants can also be provided separately from the surgical device. Example materials and example implants are shown for example in PCT/CH2019/000015, PCT/EP2020/081887, PCT/EP2020/081891, and PCT/EP2020/081881. Further, PCT/CH2019/000015, PCT/EP2020/081887, PCT/EP2020/081891, and PCT/EP2020/081881 show surgical devices that can be used in combination with the needle protection mechanism described below.

Soft tissue may be understood as all the tissue in the body that is not hardened by the processes of ossification or calcification such as bones and teeth. Example soft tissues to which implants can be felted are soft connective tissue, tendons, skeletal and heart muscle, skin, fascia, ligaments, fibrocartilage, in particular rotator cuff tendons, achilles tendon, intervertebral disc, and the meniscus. Suitable amplitudes of the reciprocal motion (i.e. a maximal penetration depth of the at least one needle) may be 1-30 mm, more preferably 6-15 mm. In particular examples the amplitude is 8.5 mm, or 12 mm. An exposed tip of the needle (which comprises barbs) may have a length the corresponds to the previously mentioned amplitudes. The at least one felting needle may have a length of at least the thickness of an implant plus 2 mm. In some embodiments the needle may have a length of at least 4, 6, 8, or 10 mm.

Additionally, the surgical device may comprise an actuator for actuating the at least one needle with the reciprocal motion. The actuator may be an electrical, mechanical, hydraulic and/or pneumatic motor.

The device comprises a needle protection mechanism to prevent the at least one felting needle from being damaged due to a contact with rigid structure during the reciprocal motion. The needle protection mechanism comprises a buckling wire that is configured to transfer the reciprocal motion from the actuator to the at least one felting needle.

The buckling wire is configured to buckle if the at least one felting needle contacts the rigid structure such that the buckling wire axially compresses. Thereby, the buckling wire absorbs the compression forces acting on the needle by bending and prevents the needle breaking if the needle hits a rigid structure. This may occur, for example, if the needle contacts a bone of the patient that is located in or below the soft tissue or any other hard material such as other surgical instruments.

In a preferred embodiment, the buckling force of the buckling wire is less than a buckling force of the at least one felting needle. Thereby, it is ensured that the buckling wire absorbs the axial forces.

In a preferred embodiment, the buckling wire is dimensioned such that a buckling force of the buckling wire is higher than the needle penetration force of the at least one felting needle in the soft tissue of a human and less than the force required to damage the at least one felting needle. Potential damage to the at least one felting needle may include bending, splintering, and/or breaking of the at least one felting needle. Thereby, it is ensured that the buckling wire can be used repeatedly. Further, this protects the felting needle from harm. In order to dimension the wire appropriately, a wire with suitable mechanical properties (buckling force, Young's modulus) and dimensions (in particular diameter and length) can be chosen.

The buckling force of the buckling wire can be estimated using the following formula:

$$F_{Buckling} = \frac{4\pi^2 EI}{L^2}$$

Wherein: $F_{Buckling}$ is the critical force when the wire starts buckling,

E the modulus of elasticity of the wire, I the moment of inertia (second moment of area) of the cross section of the wire, L the unsupported length of the wire. This formula assumes that both ends of the wire are fixed. Alternatively, one or both of the ends of the buckling wire can be hinged and be free to rotate.

Particularly preferred, the buckling force is between 0.1 and 14 N, preferably 2 to 5 to 10 N, most preferably 4.5 to 7 N. These buckling forces are particularly advantageous since they allow a penetration of the soft tissue with the felting needle while at the same time avoiding damage to the buckling wire and the felting needle. The buckling force can be adjusted by modifying the modulus of elasticity E (e.g. by choosing an appropriate material), by varying the cross-section of the wire (e.g. choosing a circular or angled cross-section, for example a square, pentagonal, or hexagonal cross-section) and by varying the length of the buckling wire.

For example, the modulus of elasticity (Young's Modulus) may be in the range of 41-75 GPa. In other embodiments the modulus of elasticity may be 200 GPa. The cross-section may be 0.1 to 0.5, 1, 5, 10 or 20 mm. The length of the wire might be between 10 and 150 mm, preferably 10 to 50, more preferably 15 to 40 mm.

In a preferred embodiment, the buckling wire comprises or is made of a shape memory alloy or an elastic soft plastic. For example, the buckling wire comprises or is made of nitinol or a metal alloy or rubber. Example plastic materials are PE, PET, Nylon, PTFE, rubber like material such as silicone rubber. These materials enable a long lifespan of the buckling wire, allow for repeated buckling and prevent the buckling wire from breaking the first time a rigid body is contacted. Shape-memory alloys may show low cycle deformation at high strains with a plateau, e.g. after 40 cycles. During these cycles, the wire may get incrementally more bent until it reaches a plateau at which the deformation remains constant. The buckling force gets reduced during the low cycle deformation due to the increased residual bend of the wire.

In a preferred embodiment, the wire has a tube shape and/or includes cut-outs. The cut-outs can define predefined breakage points to prevent the wire from breaking at undesirable places and allow a quick replacement of the wire. A tube shape allows for a collapsing and buckling. The wire could have a section with a tube shape as a pre-determined weak point. Additionally or alternatively, the buckling behavior can be controlled by twisting the wire.

In a preferred embodiment the device comprises one or more further buckling wires that transfer the reciprocal motion from the actuator to the at least one felting. The one or more further buckling wires are configured to buckle if the at least one felting needle contacts the rigid structure. In a preferred embodiment, the one or more further buckling wires are mechanically in series or in parallel to the buckling wire and/or to each other. Having multiple buckling wires may allow for a more precisely designed buckling force, since production errors average out or may provide for a failsafe in case one of the buckling wires fails.

In a preferred embodiment, the buckling wire is dimensioned such that the maximal axial compression of the buckling wire is at least a quarter of, preferably at least half or three quarters of more preferred equal or larger than a maximum penetration depth of the at least one felting needle. This reduces the penetration depth of the at least one needle and prevents the needle from being damaged.

In a preferred embodiment a maximal axial compression is more than 1 mm. Preferably the maximal axial compression is more than 4 or 6 mm, more preferably 8.5 mm, a 12 mm or more. Additionally or alternatively, the maximal axial compression is less than 30, 20 or 15 mm. These ranges allow for a comfortable felting while at the same time allowing for buckling wires that are more stable.

In a preferred embodiment, the buckling wire(s) is (are) pre-bent. Pre-bent is understood as the buckling wires having been buckled prior to use. Pre-bending the buckling wire during fabrication is beneficial to already approach or reach the plateau values. Typically, the first bending of the buckling wire requires a higher buckling force than later bending. Therefore, the buckling wire might be buckled during fabrication and prior to being sold, i.e. by applying multiple, for example 20-40, deformation cycles. During the pre-bending the wire is slightly plastically deformed which can be observed by a curve in the buckling wire and/or the internal plastic deformations.

In a preferred embodiment, the device comprises a buckling chamber, in which the buckling wire can buckle. The buckling chamber protects the buckling device from external influences, such as contaminants. The buckling wire may be configured to buckle unrestricted within the chamber or, the buckling wire may contact a wall of the chamber when buckling such that the axial compression is restricted. Unrestricted buckling allows for a more predictable force response. However, if the buckling is restricted more compact designs can be realized.

In a preferred embodiment the at least one felting needle and the buckling wire are integrally formed, in particular by a single wire. In this embodiment, a needle tip and barbs may be directly cut out of a superelastic wire. This provides a particularly simple design. A further advantage may be that the at least one felting needle and the buckling wire can be replaced as a unit and this may allow for a compact design.

A further aspect of the invention relates to a method for felting an implant to soft tissue of a patient. The method comprises the following steps:
Actuating a felting needle of a surgical device as described above with a reciprocal motion;
Contacting a rigid structure with the felting needle;
Compressing a buckling wire axially upon contacting the rigid structure such that the needle is protected from being damaged due to a contact with the rigid structure.

A further aspect of the invention relates to a method for pre-pending a buckling wire for a surgical device for felting an implant to soft tissue of the patient. The method comprises the following steps:
Providing the buckling wire, wherein the wire is preferably made of a shape-memory alloy;
Mounting the buckling wire with at least two holding sections (21, 22, 23);
Buckling a section of the buckling wire between the at least two holding sections repeatedly, preferably at least 5, 10, 20, 30 or 40 times, by moving one of the holding sections towards the other; and Preferably inserting the pre-bent wire in a surgical device for felting an implant to soft tissue of a patient.

Another aspect relates to a device for pre-bending a buckling wire, comprising at least two holding sections for mounting the buckling wire with the at least two holding sections, wherein at least one of the holding sections is movable such a that a section of the buckling wire between the at least two clamps can be buckled.

The present summary is provided only by way of example and not limitation. Other aspects of the present invention will be appreciated in view of the entirety of the present disclosure, including the entire text, claims, and accompanying figures.

BRIEF DESCRIPTION OF THE DRAWINGS

Non-limiting embodiments of the invention are described, by way of example only, with respect to the accompanying drawings, in which:

FIG. 9 shows the surgical device of FIG. 1 with a pre-bent wire.

Figure 1:
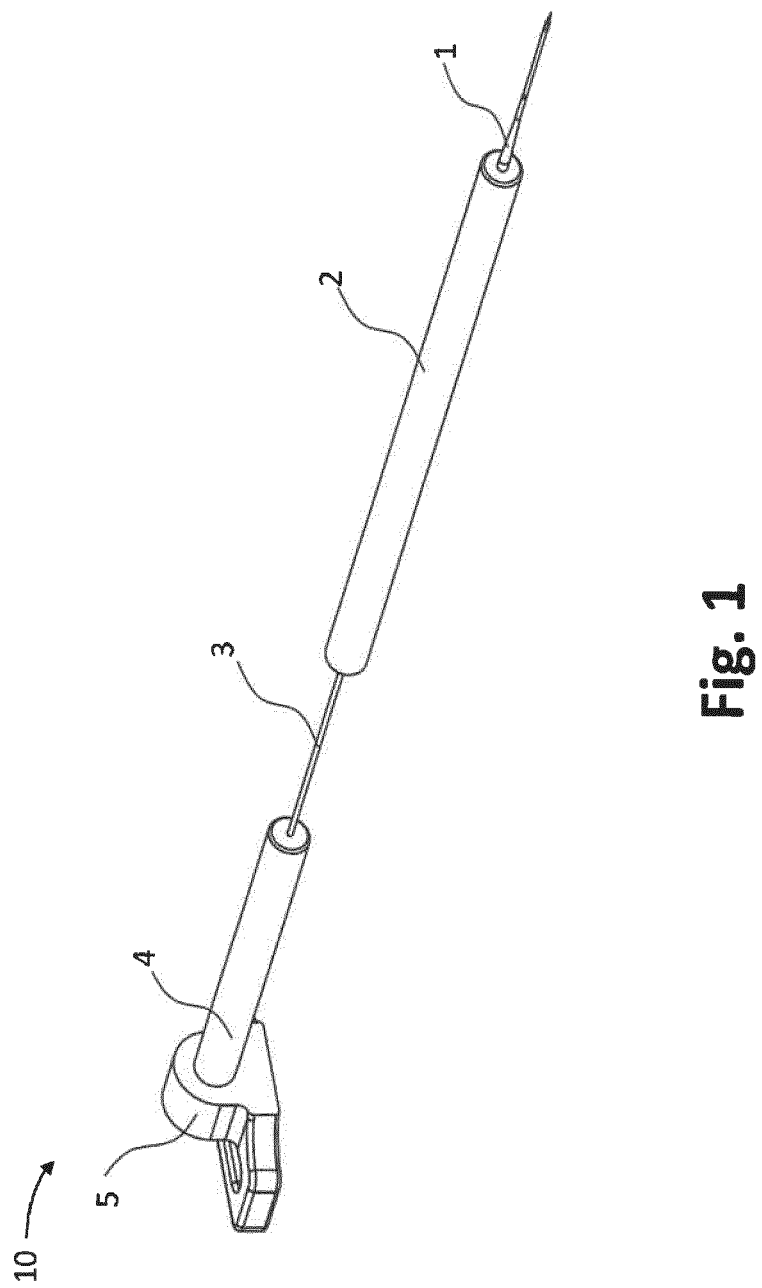
FIG. 1 shows a perspective view of a surgical device.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps, and/or components not specifically shown in the drawings.

DETAILED DESCRIPTION OF ILLUSTRATIVE EMBODIMENTS

FIG. 1 shows a surgical device 10. The device includes a felting needle 1, a distal shaft 2, a buckling wire 3, a proximal shaft 4 and a sliding yoke 5. The distal and proximal shafts 2, 4 are hollow and have a tubular shape. One section of the felting needle is exposed between the distal shaft 2 and the proximal shaft 4. This section forms the buckling wire 3. The sliding yoke 5 is connected to a motor and moves back and forth along the axial direction of the felting needle 1. During this back and forth motion the shafts 2, 4 guide the felting needle 1. The shafts 2 and 4 are fixedly attached to the wire forming the felting needle 1 and the buckling wire 3. The buckling wire 3 and the felting needle 1 may alternatively each be attached to shafts and be individually formed. In normal operation, the sliding yoke 5 and the at least one felting needle (with the buckling wire 3) move together.

Figure 2:
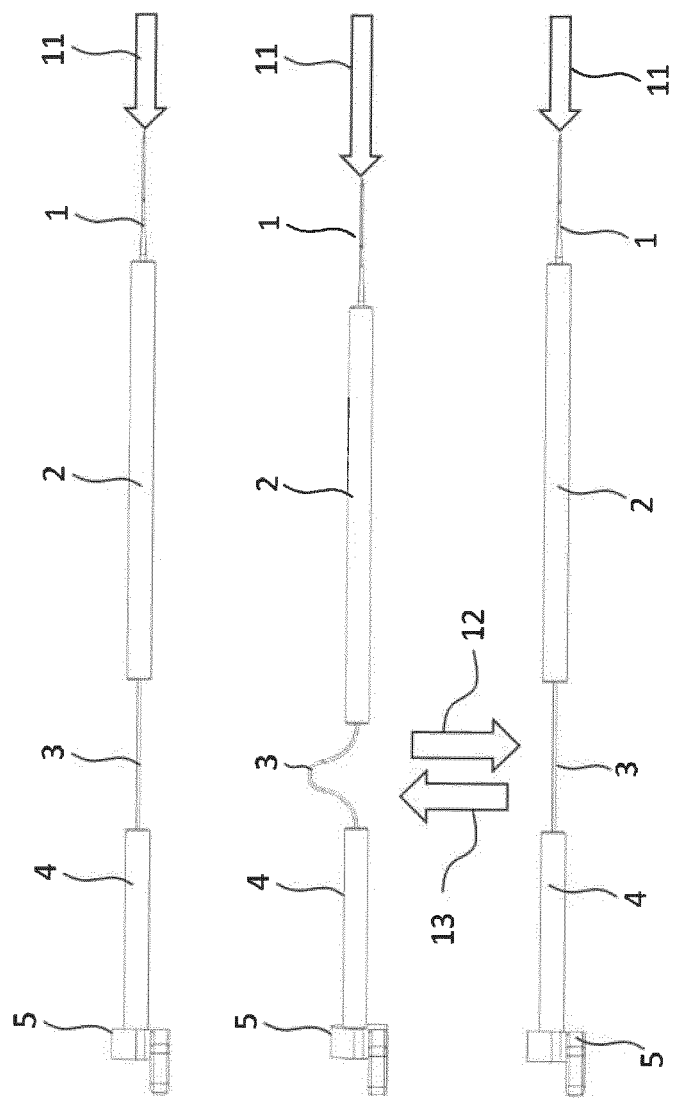
FIG. 2 shows a process sequence of with the surgical device of FIG. 1.

FIG. 2 shows a sequence of steps that occur, when the at least one felting needle collides with a rigid object. In this case, a force 11 is exerted on the needle. The force 11 is larger than the axial forces during normal operation i.e. during felting an implant to soft tissue. This axial force is transferred through a tip of the felting needle 1 to the buckling wire 3. As can be seen in the second step, the buckling wire 3 reacts by buckling and absorbing the force from the collision. When the yoke retracts, the buckling wire relaxes, since the force from the collision reduces. As long as the obstacle remains, the buckling wire 3 can buckle and relax as indicated by arrows 12 and 13 in FIG. 2 without breaking. The buckling wire 3 effectively decouples the distal shaft and felting needle from the translational actuating motion of the proximal shaft when hitting a hard surface, i.e. a surface with penetration force higher than the buckling force.

Figure 3B:
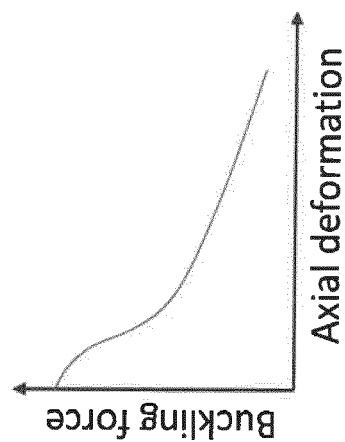
FIGS. 3A and 3B show the surgical device of FIG. 1 with a first chamber and a corresponding buckling force.
Figure 3A:
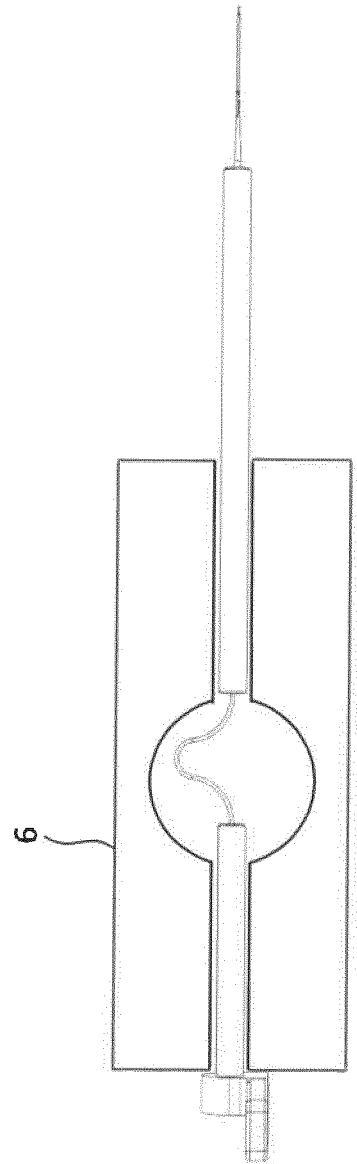

FIG. 3A shows a first buckling chamber 6 that can additionally be provided. The buckling chamber forms a space around the buckling wire and is formed such that the buckling wire can freely buckle. While FIG. 3A shows a spherical chamber, other shapes are also suitable, e.g. a cylindrical or cubicle chamber. The chamber is designed such that the buckling wire does not touch a wall when the wire buckles maximally. The maximal extension of the wire can in particular be found experimentally, e.g. by holding the tip of the felting needle in its retracted position.

FIG. 3B shows the relationship between the buckling force (i.e. the force needed to compress the buckling wire) and the axial deformation (i.e. an axial compression of the buckling wire). As can be seen from FIG. 3B, the maximal force is needed to begin buckling. Prior to reaching this critical force, for example 4.5-7 N, the buckling wire does not buckle. Thereby, the felting of an implant to tissue is not hindered by the buckling wire. If the critical force is reached, the wire starts buckling. However, as also can be seen from FIG. 3 B, the force needed to buckle the wire further reduces with increased buckling. This reduces the load on the needle tip of the at least one felting needle, which is prevented from breaking inside the patient's body or due to a collision with another surgical instrument.

Figure 4B:
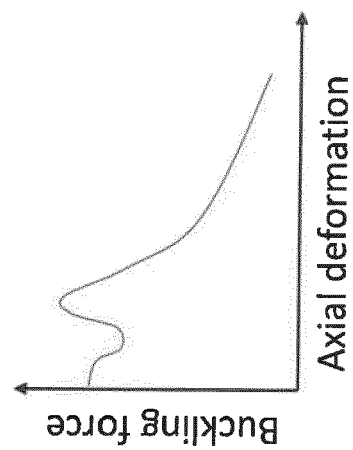
FIGS. 4A and 4B show the surgical device of FIG. 1 with a second chamber and a corresponding buckling force.
Figure 4A:
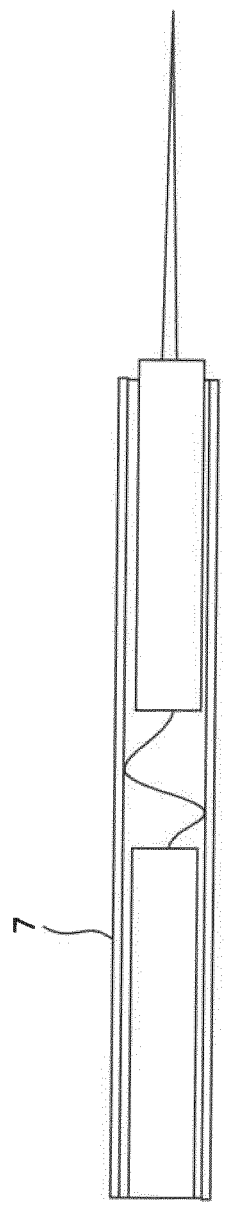

FIG. 4A shows a second buckling chamber. The second buckling chamber forms a space around the buckling wire and is formed such that the buckling wire is restricted during buckling. For example, the second buckling chamber can be formed by a tube 7, in which the felting needle 1, the distal shaft 2, the buckling wire 3, and the proximal shaft 4 are arranged. In this embodiment, when the buckling wire 3 begins to buckle, parts of the buckling wire may contact an inner wall of the second buckling chamber. This leads to a thinner device that can be used in difficult to reach soft tissues.

FIG. 4B shows the relationship between the buckling force (i.e. the force needed to compress the buckling wire) and the axial deformation (i.e. an axial compression of the buckling wire) for the restricted buckling shown in FIG. 4A. As can be seen, the restriction, i.e. the contact of the buckling wire with an inner wall of the buckling chamber leads to a second peak. In these cases, the critical buckling force of the wire 3 may be the peak that results from the contact.

Figure 5:
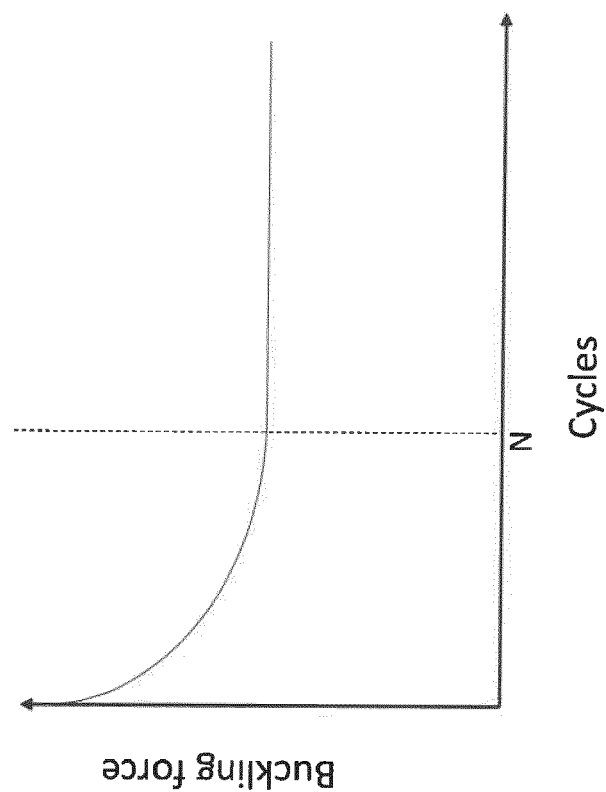
FIG. 5 shows plastic deformation and force diagrams for buckling wires.
Figure 5:
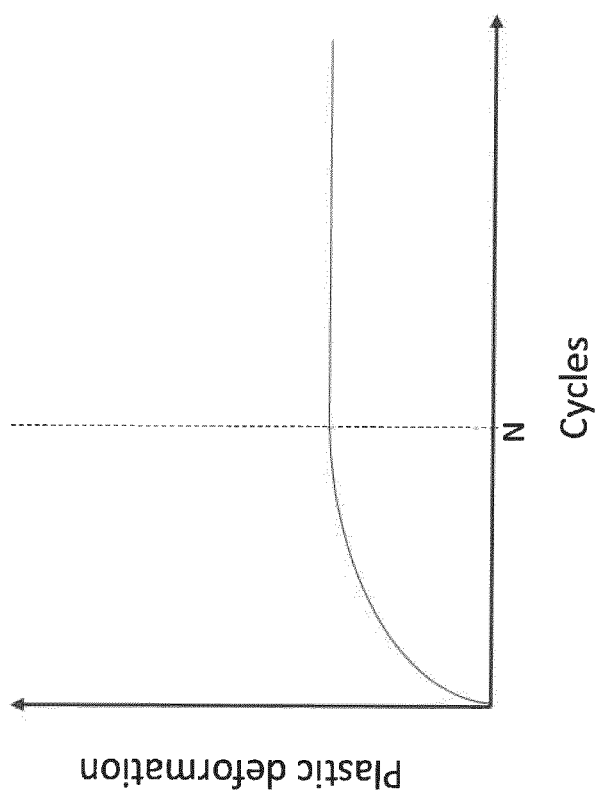

The applicant noted that the maximal buckling force decreases over time before reaching a plateau. In particular, the first time the buckling wire 3 buckles, a higher buckling force is necessary than the buckling force when the wire buckles for the third or fifth time. Without being bound to this, the reduction in buckling force may be explained by a plastic deformation in the buckling wire. However, after a number of bucklings the buckling force (approximately)

reaches a plateau. This is schematically shown in the graphs of FIG. 5. The number of deformation cycles is indicated on the x-axis. One deformation cycle describes the process of buckling and relaxing the buckling wire once. The graph on the left shows the plastic deformation during buckling dependent on the number cycles and the graph on the right shows the buckling force necessary to axially compress the buckling wire dependent on the number of cycles. The plastic deformation might be observed as a remaining curvature when the wire is relaxed. As can be seen in FIG. 5 on the right, the buckling force decreases, but reaches a plateau where the buckling force remains constant. The number of deformation cycles N indicated in FIG. 5 until the plateau is reached may be 5, 10, 20, 30 or 40 times.

It is proposed to pre-bend, e.g. buckle, the buckling wire repeatedly through multiple deformation cycles, the wire prior to use in a patient. Thereby, an operator would receive a surgical device/felting needle with constant properties. A device for pre-bending the wire 3 will be explained with reference to FIGS. 6 to 9.

Figure 6:
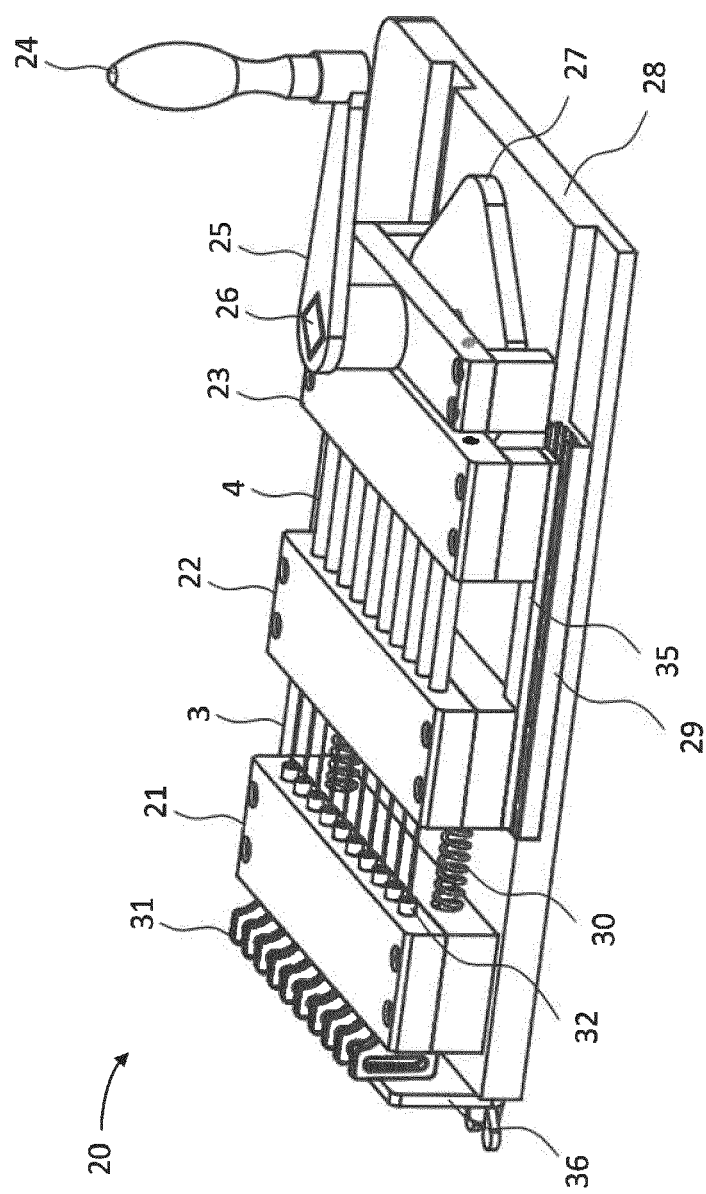
FIG. 6 shows a device for pre-bending a buckling wire.
Figure 7:
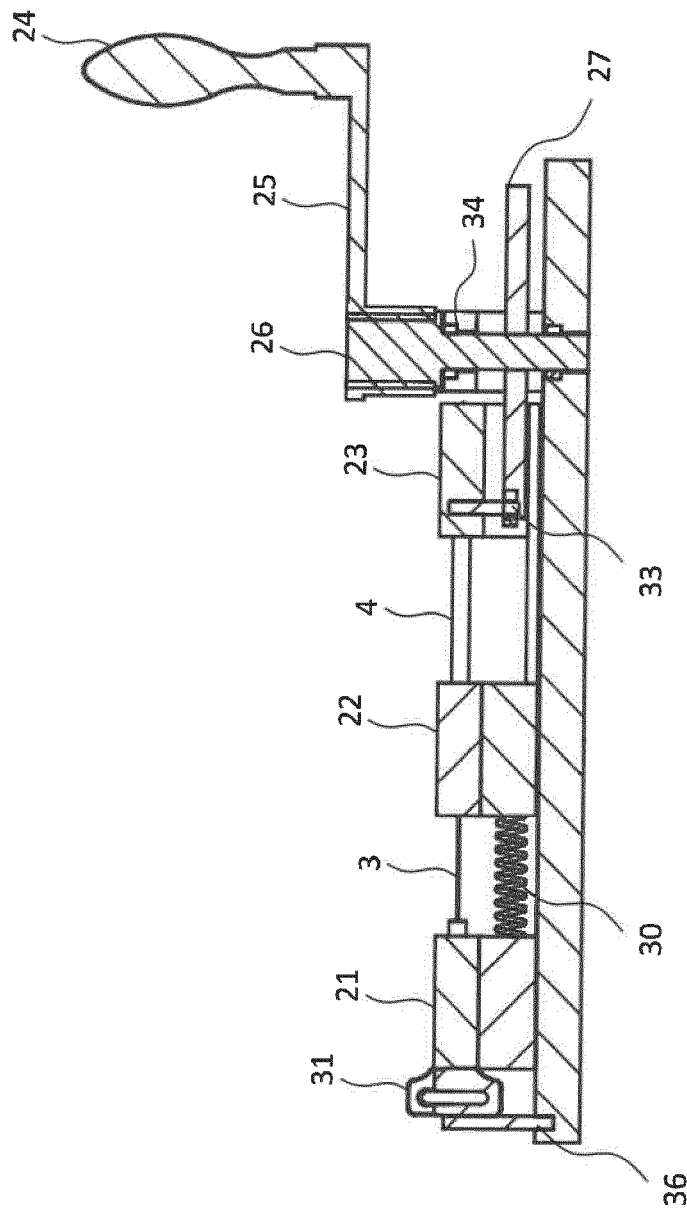
FIG. 7 shows a cross-section of the device of FIG. 6.
Figure 8:
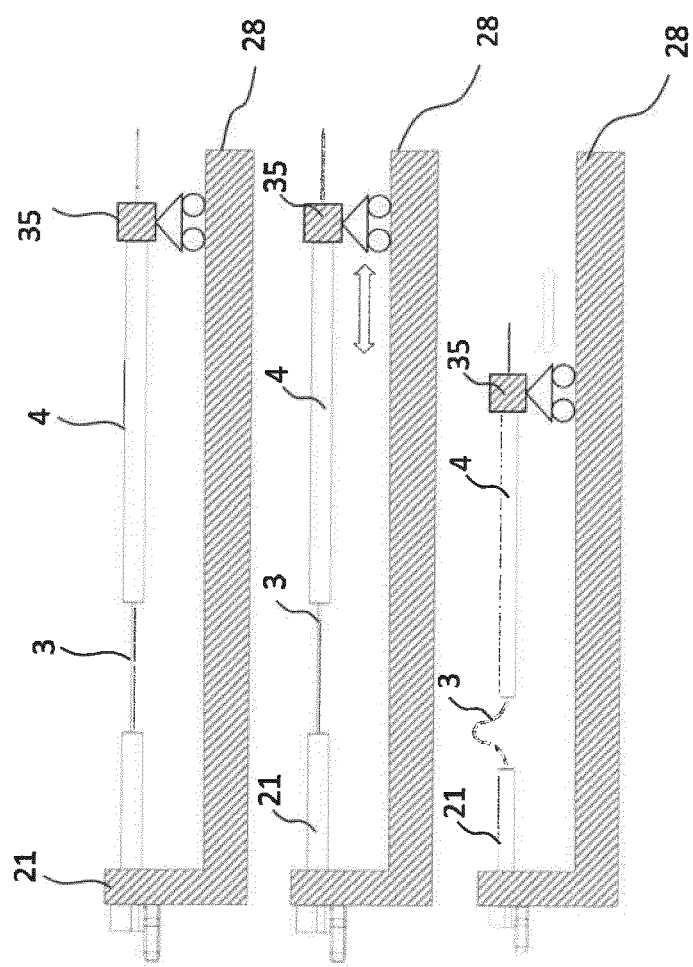
FIG. 8 shows a process sequence for pre-bending a wire.

FIG. 6 shows a perspective view of a device 20 for pre-bending multiple buckling wires 3. FIG. 7 shows a cross-section of the device of FIG. 6 and FIG. 8 shows a schematic view of the device to illustrate a method of pre-bending the buckling wires 3.

The device 20 includes a body 28 and a handle 24 for actuating the device. The handle 24 is connected to a lever 25. The lever 25 is connected on one end to the handle 24 and on the other to a drive shaft 26. The drive shaft 26 is rotatably connected to the body 28 with a bearing 34. The other end of the drive shaft 26 connects to an eccentric 27. When the handle 24 is actuated by rotating the handle 24 around bearing 34, the eccentric 27 is actuated (i.e. rotated).

The device 20 includes a first holding section 21 and a slide 35 with second and third holding sections 22 and 23. The second and third holding sections are fixedly connected to each other with a bar. The slide 35 can move back and forth along a longitudinal direction on a track 29 in the body 28. Further, the third holding section 23 of the slide 35 includes a pin 33. The pin 33 is permanently in contact with an outer face of the eccentric 27. The first holding section 21 is fixed to the body 28 and the slide 35 and the first holding section 21 are connected to each other with an elastic element (e.g., spring 30) to each other. The spring is biased such that the slide 35 is permanently pushed towards the eccentric 27.

When a user actuates the device with the handle 24, the eccentric 27 is rotated. The rotation of the eccentric 27 drives the slide 35 back and forth since the spring 30 pushes the slide 35 permanently against the outer face of the eccentric 27. In the present embodiment, the eccentric 35 has a quadratic shape with rounded edges. However, any other suitable eccentric shape can be used. In the present embodiment, a single rotation of the handle 35 results in the slide sliding 4 times back and forth. Further the body 28 includes a removable back plate 36.

Though the device 20 includes a handle 24 the present embodiment, the device could also be driven by a motor as is known in the art.

As can be seen from FIG. 6, the device 20 can receive multiple surgical devices 10 as shown in FIG. 1. In the present embodiment the yoke 5 is removed. Before (or after in alternative embodiments) the devices 10 are inserted, the felting needles may be protected with a tip cover 31 in order to protect the felting needle and a user of the device 20. Before the surgical devices 10 are inserted, the back plate 36 is removed. Then, the surgical devices 10 can be inserted from the side of the back plate through the first holding section 21 and the second holding section 22 until the proximal end of the surgical device 10 (proximal end of shaft 4) contacts holding section. In some embodiments, any one, two or all of the holding sections 21, 22, 23 may comprise additional means to clamp the surgical devices 10. Alternatively, such as shown in FIG. 6, the surgical devices 10 can be loosely guided by the holding sections 21, 22, and 23. When the surgical devices are fully inserted, the back plate 36 is closed and the tip cover 31 contacts the back plate at the distal end of the surgical device 10. Now, the surgical device 10 cannot move along its longitudinal direction.

When the handle 24 is actuated, and the slide 35 starts moving, then the third holding section 23 pushes the proximal shaft 4 of the device towards the back plate 36. As soon as the buckling force of the buckling section 3 is exceeded, the buckling section 3 starts buckling as can be seen in FIG. 8. This process is repeated multiple times, e.g. 40 times, until the buckling force as for example depicted in FIG. 5 reaches a plateau. After the surgical device 10 is prebend, a curve in the buckling wire 3 may remain as can be seen in FIG. 9.

Although the present invention has been described with reference to preferred embodiments, workers skilled in the art will recognize that changes may be made in form and detail without departing from the spirit and scope of the invention.

The invention claimed is:

1. A surgical device for felting an implant to soft tissue of a patient, comprising at least one felting needle configured to move reciprocally, the at least one felting needle configured to entangle the implant with the soft tissue, wherein the device comprises a needle protection mechanism to prevent the at least one felting needle from being damaged due to a contact with a rigid structure during the reciprocal motion, characterized in that needle protection mechanism comprises a buckling wire that transfers the reciprocal motion from an actuator to the at least one felting needle, wherein the buckling wire is configured to buckle, if the at least one felting needle contacts the rigid structure, such that the buckling wire is axially compressed.

2. The surgical device according to claim 1, wherein wire is dimensioned such that a buckling force of the buckling wire is higher than the needle penetration force of the soft tissue and less than the force required to damage the at least one felting needle, by plastic bending, splintering and/or breaking the at least one felting needle.

3. The surgical device according to claim 2, wherein the buckling force is 0.1-40 N.

4. The surgical device according to claim 2, wherein the buckling force is 4.5-7 N.

5. The surgical device according to claim 1, wherein the buckling wire comprises or is made of a shape-memory material or an elastic soft plastic and/or wherein the wire has a tube shape and/or includes cut-outs.

6. The surgical device according to claim 1, wherein the device comprises one or more further buckling wires, that transfer the reciprocal motion from the actuator to the at least one felting needle, wherein the one or more further buckling wires are configured to buckle when the at least one felting needle contacts the rigid structure.

7. The surgical device according to claim 6, wherein the one or more further buckling wires are mechanically in series or in parallel to the buckling wire and/or to each other.

8. The surgical device according to claim 1, wherein the buckling wire is dimensioned such that the maximal axial compression of the buckling wire is at least a quarter of a maximal penetration depth of the at least one felting needle.

9. The surgical device according to claim 1, wherein the maximal axial compression is more than 1 mm and/or wherein the maximal axial compression is less than 30 mm.

10. The surgical device according to claim 1, wherein the buckling wire is pre-bent.

11. The surgical device according to claim 1, wherein the device comprises a buckling chamber, in which the buckling wire can buckle, wherein the wire and the chamber are configured such that the wire can buckle unrestricted within the chamber.

12. The surgical device according to claim 1, wherein the device comprises a buckling chamber, in which the buckling wire can buckle, wherein the wire and the chamber are configured such that the wire contact a wall of the chamber when buckling such that the axial compression is restricted.

13. The surgical device according to claim 1, wherein the at least one felting needle and the buckling wire are integrally formed by a single wire.

14. The surgical device according to claim 1, wherein the buckling wire is dimensioned such that the maximal axial compression of the buckling wire is equal to or larger than a maximal penetration depth of the at least one felting needle.

15. The surgical device according to claim 1, wherein the buckling wire is dimensioned such that the maximal axial compression of the buckling wire is at least three quarters of a maximal penetration depth of the at least one felting needle.

16. The surgical device according to claim 1, wherein the maximal axial compression is 8.5 mm or more and/or wherein the maximal axial compression is less than 20 mm.

17. A method for felting an implant to soft tissue of a patient, comprising the following steps:
- actuating a felting needle of a surgical device according to claim 1 with a reciprocal motion;
- contacting a rigid structure with the felting needle;
- compressing a buckling wire axially upon contacting the rigid structure such that the needle is protected from being damaged due to a contact with the rigid structure.

* * * * *